United States Patent [19]

Kitamura et al.

[11] Patent Number: 4,752,930
[45] Date of Patent: Jun. 21, 1988

[54] WATCH DOG TIMER

[75] Inventors: Fumihide Kitamura; Yuuichi Saitoh, both of Itami, Japan

[73] Assignee: Mitsubishi Denki Kabushiki Kaisha, Tokyo, Japan

[21] Appl. No.: 877,424

[22] Filed: Jun. 23, 1986

[30] Foreign Application Priority Data

Jun. 24, 1985 [JP] Japan .................. 60-138609

[51] Int. Cl.$^4$ ............................................. G06F 11/10
[52] U.S. Cl. ............................................ 371/62; 371/12
[58] Field of Search ............... 371/12, 62; 364/431.11, 364/200, 900

[56] References Cited

U.S. PATENT DOCUMENTS

| | | | |
|---|---|---|---|
| 4,023,109 | 5/1977 | Shreve | 371/62 X |
| 4,340,965 | 7/1982 | Beckman et al. | 371/62 |
| 4,355,359 | 10/1982 | Kanegae et al. | 371/62 X |
| 4,538,273 | 8/1985 | Lasser | 371/62 |
| 4,541,050 | 9/1985 | Honda et al. | 371/62 X |
| 4,586,180 | 4/1986 | Anders et al. | 371/12 X |
| 4,594,685 | 6/1986 | Owens | 364/900 |
| 4,627,060 | 12/1986 | Huang et al. | 371/62 |

Primary Examiner—Charles E. Atkinson
Attorney, Agent, or Firm—Lowe, Price, LeBlanc, Becker & Shur

[57] ABSTRACT

A watch dog timer (20) is controlled to permit or inhibit operation of a free run counter (3). When a flip-flop (14) is reset by a reset signal, no clock signal is supplied to the free run counter (3), the operation of which is then inhibited. When a microcomputer (1) outputs an address signal (5) and a write signal (6), an address decoder (12) decodes the address signal to open an AND gate (13), thereby to set the flip-flop (14). When the flip-flop (14) is set, and AND gate (17) is opened to supply clock pulses to the free run counter (3), which in turn starts counting the clock pulses. When the microcomputer (1) operates abnormally and no clear signal is supplied to the free run counter (3) from a clear decision circuit (2), the free run counter (3) outputs a signal indicating abnormal operation of the microcomputer (1) upon counting a prescribed counter value.

7 Claims, 1 Drawing Sheet

WATCH DOG TIMER

BACKGROUND OF THE INVENTION

1. Field of the Invention

The present invention relates to a watch dog timer. More specifically, it relates to a watch dog timer which detects runaway of a microcomputer to output a signal for returning the same to normal operation.

2. Description of the Prior Art

FIG. 1 is a block diagram showing a conventional watch dog timer. Referring to FIG. 1, description is now made on the structure of the conventional watch dog timer 10. A microcomputer 1 is connected with a clear decision circuit 2 through a data bus 4, an address bus 5 and a write signal line 6. A reset signal 7 outputted from the microcomputer 1 is supplied to the clear decision circuit 2 and a free run counter 3. The microcomputer 1 further supplies clock signals 8 to the free run counter 3, which is adapted to count the clock signals 8. The clear decision circuit 2 supplies a clear signal 9 to the free run counter 3 on the basis of data and address supplied from the microcomputer 1 through the data bus 4 and the address bus 5.

Description is now made on the operation of the conventional watch dog timer 10 as shown in FIG. 1. Upon application of power, the free run counter 3 immediately starts counting the clock signals 8. In normal operation of the microcomputer 1, a specific code is supplied to the clear decision circuit 2 within a prescribed period through the data bus 4 and the address bus 5, and the clear decision circuit 2 decides the specific code to supply the clear signal 9 to the free run counter 3. The free run counter 3 is cleared by the clear signal 9. Thus, the free run counter 3 is cleared by the clear signal 9 from the clear decision circuit 2 every time it counts a prescribed number of clocks, so far as the microcomputer 1 operates normally. Therefore, the free run counter 3 outputs no reset signal 11 indicating abnormal operation of the microcomputer 1. Consequently, the microcomputer 1 can continuously execute programs stored in memory (not shown) contained therein.

When the microcomputer 1 operates abnormally, no specific code is supplied from the microcomputer 1 to the clear decision circuit 2 through the data bus 4 and the address bus 5, whereby the clear decision circuit 2 outputs no clear signal 9. Therefore, the free run counter 3 is not cleared and continuously counts the clock signals 8. Upon counting a predetermined number of clock signals, the free run counter 3 outputs the reset signal 11 indicating abnormal operation of the microcomputer 1. The microcomputer 1 stops execution of the programs by the reset signal 11 outputted from the free run counter 3, to re-start the execution from the first program. Thus, the microcomputer 1 is prevented from runaway.

The free run counter 3 can also be cleared by the reset signal 7 outputted from the microcomputer 1.

The conventional watch dog timer 10 of the aforementioned structure achieves the watch-dog function so far as the power is applied to supply the clock signals 8 to the free run counter 3. Therefore, runaway of, e.g., an on-vehicle microcomputer employed to control a printer may not cause any serious trouble. In order to drive the watch dog timer 10, however, specific codes must be continuously supplied to the clear decision circuit 2 for clearing the free run counter 3. Therefore, a number of such specific codes must be inserted in the programs of the microcomputer 1, leading to increase in the programs to be executed.

SUMMARY OF THE INVENTION

Accordingly, the principal object of the present invention is to provide a watch dog timer which can stop operation of a counter included therein when no watch-dog function is required, thereby to prevent increase in programs of a microcomputer.

Briefly stated, the watch dog timer according to the present invention counts clock signals by a counter means, which is cleared in response to normal operation of a computer, and outputs a signal indicating abnormal operation of the computer when the computer operates abnormally and the counter means counts a predetermined count value, while a control means makes the counter means stop counting the clock signals in response to an external control signal when watch-dog function is not required.

Thus, according to the present invention, the counter means stops counting in response to the external control signal when no watch-dog function is required, whereby no insertion of specific codes is required in the programs of the computer to clear the counter means, leading to prevention of increase in the programs.

In a preferred embodiment of the present invention, gate means is closed by a decoded signal outputted in response to a predetermined address signal outputted from the computer, thereby to inhibit supply of the clock signals to the counter means.

In a more preferred embodiment of the present invention, the decoded signal is supplied to the gate means only when the computer executes write or read control operation, thereby to inhibit supply of the clock signals to the counter means.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
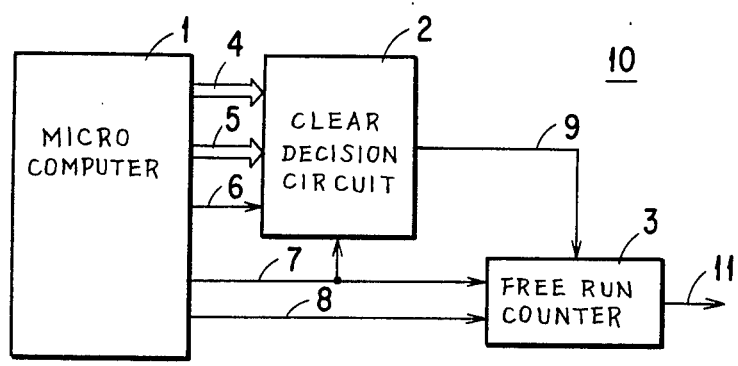
FIG. 1 is a block diagram showing a conventional watch dog timer.
Figure 2:
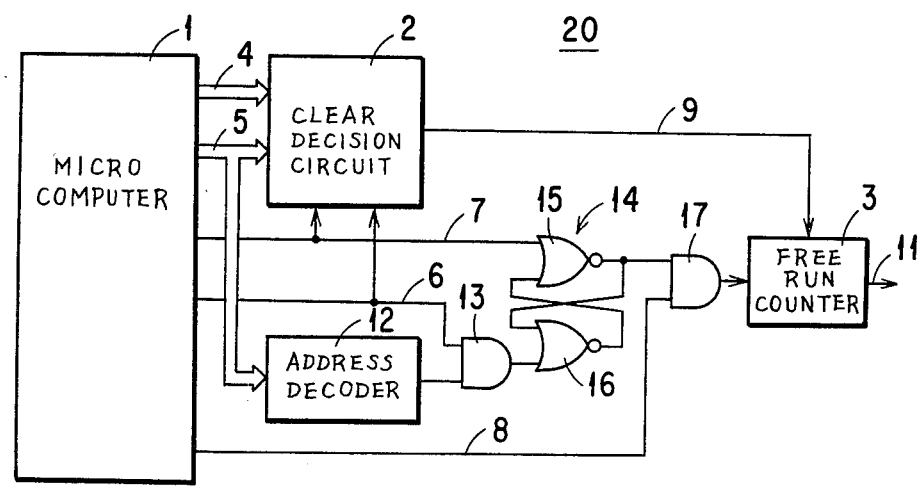
FIG. 2 is a block diagram showing a watch dog timer according to an embodiment of the present invention.

FIG. 2 is a block diagram showing an embodiment of the present invention. Referring to FIG. 2, description is now made on the structure of this embodiment. A watch dog timer 20 as shown in FIG. 2 is provided with an address decoder 12, AND gates 13 and 17 and a flip-flop 14 formed by NOR gates 15 and 16, in order to inhibit supply of clock signals 8 to a free run counter 3 when no watch-dog function is required. A microcomputer 1, a clear decision circuit 2 and the free run counter 3 are identical to those in FIG. 1. The clear decision circuit 2, the free run counter 3 and the address decoder 12 etc. are formed by semiconductor integrated circuits.

The address decoder 12 is adapted to decode specific address signals outputted from the microcomputer 1 when no watch-dog function is required. Decoded output signals from the address decoder 12 are supplied to one input terminal of the AND gate 13. The other input terminal of the AND gate 13 is supplied with write control signals from the microcomputer 1. Therefore, the AND gate 13 is opened only when the microcomputer 1 outputs the write control signals as well as the address decoder 12 outputs the decoded signals, to supply high-level signals to one input terminal of the NOR gate 16.

An input terminal of the NOR gate 15 is supplied with reset signals from the microcomputer 1. The flip-flop 14 is reset by the reset signals from the microcomputer 1, to supply low-level signals to an input terminal of the AND gate 17. The other input terminal of the AND gate 17 is supplied with clock signals 8 from the microcomputer 1. Thus, when the flip-flop 14 is reset, the AND gate 17 supplies no clock signal 8 to the free run counter 3, thereby to stop the function as the watch dog timer 20.

Description is now made on definite operation of the watch dog timer 20 according to this embodiment. Upon application of power, the microcomputer 1 supplies a high-level reset signal 7 to one input terminal of the NOR gate 15, whereby the flip-flop 14 is reset and one input terminal of the AND gate 17 is turned to a low level. Thus, output of the clock signals 8 from the AND gate 17 is inhibited and the free run counter 3 retains stoppage of counting, whereby the operation of the watch dog timer 20 is continuously inhibited.

In order to switch the watch dog timer 20 from the aforementioned operation-inhibited state to an operation-permitted state, the microcomputer 1 must perform write operation with respect to a specific address. When the microcomputer 1 performs such write operation, a specific address signal outputted to the address bus 5 is decoded by the address decoder 12, whereby a decoded signal is supplied to the other input terminal of the AND gate 13. The AND gate 13 obtains the logical product of a write control signal 6 and the decoded signal to supply a high-level signal to one input terminal of the NOR gate 16, whereby the flip-flop 14 is set to supply the high-level signal to one input terminal of the AND gate 17. Thus, the AND gate 17 is opened to supply the clock signals 8 to the free run counter 3, which in turn counts the clock signals 8, so as to perform the watch-dog function as hereinabove described with reference to FIG. 1.

The watch dog timer 20 in the aforementioned operation-permitted state can again be switched to the operation-inhibited state by resetting the flip-flop 14 through the reset signal 7. Thus, even if the microcomputer 1 runs away, no reset signal 7 is outputted and hence the watch dog timer 20, which is in the operation-permitted state, will not enter the operation-inhibited state.

As hereinabove described, this embodiment enables addition of a mode for inhibiting the operation of the watch dog timer 20 while completely maintaining the watch-dog function. In such a mode of inhibiting the operation of the watch dog timer 20, no specific code is required to clear the free run counter 3, whereby increase in programs is prevented.

Although the watch dog timer 20 in the aforementioned embodiment is switched from the operation-inhibited state to the operation-permitted state by executing writing in a specific address, the mode may be switched by executing reading from the specific address.

Further, although the operation for writing in or reading from the specific address is executed along the programs stored in memory contained in the microcomputer 1 in the aforementioned embodiment, such operation can be performed by connecting external ROM to the microcomputer 1 and executing the writing in or reading from the specific address by programs stored in the ROM.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A watch dog timer for detecting abnormal operation of a computer, said watch dog timer comprising:
   means for detecting operation of said computer and for generating a detector signal indicating whether computer operation is normal or abnormal;
   counter means for counting clock signals generated by the computer;
   means for clearing said counter means in response to the detector signal indicating a normal operation of said count value during abnormal operation of said computer and, in response to counting of a predetermined count value during abnormal operation of said computer, outputting a watch dog signal indicating an abnormal operation of said computer;
   control means for inhibiting counting of said clock signals by said counter means in response to an external control signal indicating that a watch dog function is not required; and
   clear signal output inhibiting means for clearing said counter means on the basis of data and address supplied from said computer in normal operation of said computer and inhibiting output of a clear signal in response to abnormal operation of said computer.

2. A watch dog timer in accordance with claim 1, wherein
   said counter means and said control means are formed by semiconductor integrated circuits.

3. A watch dog timer for detecting abnormal operation of a computer, said watch dog timer comprising:
   means for detecting operation of said computer and for generating a detector signal indicating whether computer operation is normal or abnormal;
   counter means for counting clock signals generated by the computer;
   means for clearing said counter means in response to the detector signal indicating a normal operation of said computer and, in response to counting of a predetermined count value during abnormal operation of said computer, outputting a watch dog signal indicating an abnormal operation of said computer; and
   control means for inhibiting counting of said clock signals by said counter means in response to an external control signal indicating that a watch dog function is not required, said control means including clock signal output inhibiting means for inhibiting supply of said clock signals to said counter means when said computer outputs a predetermined address signal.

4. A watch dog timer in accordance with claim 3, wherein
   said counter means and said control means are formed by semiconductor integrated circuits.

5. A watch dog timer in accordance with claim 3, wherein
    said clock signal output inhibiting means includes:
    a decoder for outputting a decoded signal in response to output of said predetermined address signal from said computer, and
    gate means for inhibiting supply of said clock signals to said counter means in response to supply of said decoded signal from said decoder.

6. A watch dog timer in accordance with claim 5, wherein
    said gate means includes means supplied with a write or read control signal from said computer for inhibiting output of said clock signals in response to supply of said decoded signal in write or read control operation.

7. A watch dog timer in accordance with claim 5, wherein
    said computer includes program memory,
    said address decoder including means for outputting said decoded signal on the basis of an address signal read from said program memory.

* * * * *